(12) United States Patent
Green et al.

(10) Patent No.: US 7,820,226 B2
(45) Date of Patent: *Oct. 26, 2010

(54) PRODUCTION OF FLAX PROTEIN ISOLATE

(75) Inventors: Brent Everett Green, Winnipeg (CA); Ronald W. Martens, Altona (CA); Johann Franz Tergesen, Vancouver (CA); Radka Milanova, Vancouver (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 1173 days.

This patent is subject to a terminal disclaimer.

(21) Appl. No.: 10/493,110

(22) PCT Filed: Oct. 10, 2002

(86) PCT No.: PCT/CA02/01526

§ 371 (c)(1), (2), (4) Date: Dec. 6, 2004

(87) PCT Pub. No.: WO03/030652

PCT Pub. Date: Apr. 17, 2003

(65) Prior Publication Data

US 2005/0107593 A1        May 19, 2005

Related U.S. Application Data

(60) Provisional application No. 60/327,775, filed on Oct. 10, 2001, provisional application No. 60/333,492, filed on Nov. 28, 2001.

(51) Int. Cl.
*C07K 14/415* (2006.01)

(52) U.S. Cl. .................. 426/656; 426/430; 426/433; 426/481; 426/482; 426/507; 530/377; 530/378

(58) Field of Classification Search ............... 426/656, 426/430, 443, 481, 482, 507; 530/377, 378
See application file for complete search history.

(56) References Cited

U.S. PATENT DOCUMENTS 2,573,072 A    10/1951   Vassel (Continued)

FOREIGN PATENT DOCUMENTS

WO         WO 00/54608        9/2000

OTHER PUBLICATIONS

Dev D. K. et al. "Nitrogen extractabiltiy and buffer capacity of defatted linseed flour". Journal of the Science of food and agriculture; vol. 37(2); 1986; pp. 199-205.

(Continued)

*Primary Examiner*—Anthony Weier
(74) *Attorney, Agent, or Firm*—Michael I. Stewart; Sim & McBurney

(57) ABSTRACT

Flax and linola oil seed protein isolated are provided. Such isolates are made by extracting flax and linola oil seed protein from the oil seed meal, concentrating the aqueous protein solution, diluting the concentrated protein solution to form protein micelles, collecting mass. Further flax protein isolate may be recovered from the supernatant from the protein micellar formation. The protein isolated have a protein content of at least about 90 wt % (N ×6.25), preferably at least about 100 wt %, on a dry weight basis.

21 Claims, 1 Drawing Sheet

U.S. PATENT DOCUMENTS

| | | | |
|---|---|---|---|
| 2,607,767 | A | 8/1952 | Vassel |
| 3,099,649 | A | 7/1963 | Kawamura et al. |
| 4,085,229 | A | 4/1978 | Staron |
| 4,091,121 | A | 5/1978 | Hawley |
| 4,208,323 | A | 6/1980 | Murray et al. |
| 4,244,973 | A | 1/1981 | van Megan |
| 4,285,862 | A | 8/1981 | Murray et al. |
| 5,844,086 | A | 12/1998 | Murray |
| 5,925,401 | A | 7/1999 | Kankaanpää-Anttila et al. |
| 6,005,076 | A | 12/1999 | Murray |
| 6,359,017 | B1 | 3/2002 | Bruckner et al. |

OTHER PUBLICATIONS

Dev D.K. et al. "Function and microstructural characteristics of linseed flour and a protein isolate". Humboldt Univ. ZU Berlin; vol. 19(4); 1986; pp. 331-337.

Dev D.K. et al. "Preparation and functional properties of linseed protein products . . . ". Journal of food science; vol. 53(6); 1988; pp. 1934-1937;57.

Painter and Nesbit. "Nitrogenous Constituents of Flaxseed". Industrial and Engineering Chemistr; vol. 38(1); 1946; pp. 95-98.

Wanasundara & Shahidi. "Removal of flaxseed by chemical and enzymatic treatments". Food Chemistry; vol. 59(1); 1997; pp. 47-55.

MacMichael, ed. "Bi-weekly Bulletin". Market Analysis Div., Strategic Policy Branch, Marketing Policy Directorate, Agri. and Agri-Food Canada, Winnipeg Mb; 2000; vol. 13(15).

Vassel and Nesbitt. "The Nitrogenous Constituents of Flaxseed II. The Isolation of a Purified Protein Fraction". J. of Biological Chemistry vol. 159(33); 1945; pp. 571-584.

Madhusudhan and Singh. "Isolation and Characterization of the Major Fraction (12 S) of Linseed Proteins". J. Agric. Food Chem.; vol. 33; 1985; p. 673-677.

Smith et al. "Linseed Proteins . . . Alkali Dispersion and Acid Precipitation". Industrial and Engineering Chemistry; vol. 38(3); 1946; p. 353-356.

Osborne and Harris. "Nitrogen in Protein Bodies". Journal of American Chemical Society; vol. 22(4); 1903; p. 323 to 353.

Green. "Linola". Australian New Crops Newsletter. Issue No. 3; 1995.

Baskakov V. Llia et al. Folding of prion protein to its native α-Helical conformation is under kinetic control. 2001 Vo. 276, No. 23 pp. 19687-19690. XP-002222166.

Dev, D. K. and Quensel E. Functional and microstructural Characteristics of linseed (*Linum usitatissimum* L.) flour and a protein isolate.

Dev, D.K. et al. Nitrogen Extractability and Buffer Capacity of Defatted Linseed(*Linum usitatissimum* L.) Flour. 1986, 37, pp. 199-205.

Dev, D.K. and Quensel E. Preparation and Functional Properties of Linseed Protein Products Containing Differing levels of mucilage. 1988, vol. 53 pp. 1834-1837 XP-002222167.

PRODUCTION OF FLAX PROTEIN ISOLATE

BACKGROUND TO RELATED APPLICATIONS

This application claims priority under 35 USC 119(e) from copending U.S. Patent Applications Ser. Nos. 60/327,775 filed Oct. 10, 2002 and Ser. No. 60/333,492 filed Nov. 28, 2002.

FIELD OF INVENTION

The present invention relates to a novel protein isolate derived from any flax oil seed, including the low linolenic acid variety linola oil seed, and the production thereof.

BACKGROUND OF THE INVENTION

In U.S. Pat. No. 4,285,862 (Murray IA), there is described the provision of a protein isolate in the form of an amorphous, viscous, sticky, gluten-like protein mass (PMM), or a dried form of the mass. The amorphous protein mass is formed settling an aqueous dispersion of protein micelles consisting of homogeneous amphiphilic protein moieties. The aqueous dispersion is formed by a procedure described in detail in U.S. Pat. No. 4,208,323 (Murray IB) wherein protein is extracted from a protein source material using a food grade salt solution under controlled conditions, the protein concentration of the resultant extract is increased while maintaining the same salt concentration, and the concentrated protein solution is diluted, thereby forming the aqueous dispersion of protein micelles. There is no suggestion in this prior art that the procedures described therein may be applied or may be modified to apply to the recovery of a flax protein isolate from flax oil seed meal.

SUMMARY OF INVENTION

The present invention provides a protein isolate of any flax oil seed and a low linolenic acid mutant known as linola oil seed and a procedure for preparation of the same. A protein isolate is defined as a protein containing at least about 90 wt % protein at a Kjeldahl nitrogen conversion rate of N×6.25. The term "protein content" as used herein refers to the quantity of protein in the protein isolate expressed on a dry weight basis. Such novel protein isolates and their preparation are not described in the Murray IA and IB patents.

Linola oil seed is a mutant of flax oil seed in which the fatty acid composition has been changed and linolenic acid (C18:3) has been substantially reduced from about 50% in conventional flax oil seed to about 2%, through traditional breeding procedures. These modifications were made to provide from the resulting linola oil seed an edible polyunsaturated oil substantially similar to sunflower oil in fatty acid composition.

As far as the applicants are aware, there has not previously been described the preparation of protein isolates from flax oil seed or linola oil seed. The applicants are aware of attempts to provide flax protein products, such as described in U.S. Pat. No. 5,925,401, wherein a flax product containing 35 to 60 wt % flax protein is provided, well below the protein content required to qualify as an isolate.

Accordingly, in one aspect of the present invention, there is provided a flax oil seed protein isolate having a protein content of at least about 90 wt %, as determined by Kjeldahl nitrogen×6.25 (N×6.25) on a dry weight basis, preferably a protein content of at least about 100 wt %. The flax oil seed protein isolate may be derived from linola, a low linolenic acid variety of flax oil seed. The flax protein isolate preferably is provided in a substantially undenatured form. The flax protein isolate may be provided in the form of a wet protein micellar mass or in a dry powdered form. The flax protein isolate also may be provided in the form of dried supernatant from the precipitation of flax protein micelles. In addition, the flax protein micelles may be in the form of a dried combination of concentrated supernatant from the precipitation of flax protein micelles and precipitated flax protein micelles.

In another aspect of the present invention, there is provided a process of preparing a flax protein isolate, which comprises (a) extracting a flax oil seed meal to cause solubilization of protein in said oil seed meal and to form an aqueous protein solution, (b) separating the aqueous protein solution from the residual oil seed meal, (c) increasing the protein concentration of said aqueous protein solution while maintaining the ionic strength substantially constant by using a selective membrane technique to provide a concentrated protein solution, (d) diluting said concentrated protein solution into chilled water to cause the formation of protein micelles, (e) settling the protein micelles to form an amorphous, sticky, gelatinous, gluten-like protein micellar mass, and (f) recovering the micellar mass from supernatant having a protein content of at least about 90 wt %, as determined by Kjeldahl nitrogen×6.25 on a dry weight basis.

Supernatant from the settling of the protein micellar mass may be processed to recover further flax protein isolate. The supernatant may be concentrated using a membrane technique and the concentrated supernatant dried. Alternatively, the concentrated supernatant may be mixed with the protein micellar mass and the mixture is dried.

The flax protein isolate product in the form of protein micellar mass is described herein as "gluten-like". This description is intended to indicate the appearance and feel of the isolate are similar to those of vital wheat gluten and is not intended to indicate chemical identity to gluten.

The flax protein isolate produced according to the process herein may be used in conventional applications of protein isolates, such as, protein fortification of processed foods, emulsification of oils, body formers in baked goods and foaming agents in products which entrap gases. In addition, the protein isolate may be formed into protein fibers, useful in meat analogs, may be used as an egg white substitute or extender in food products where egg white is used as a binder. The flax protein isolate may be used as nutritional supplements. Other uses of the flax protein isolate are in pet foods, animal feed and in industrial and cosmetic applications and in personal care products.

Flax oil seed also is referred to as linseed oil seed.

GENERAL DESCRIPTION OF INVENTION

Figure 1:
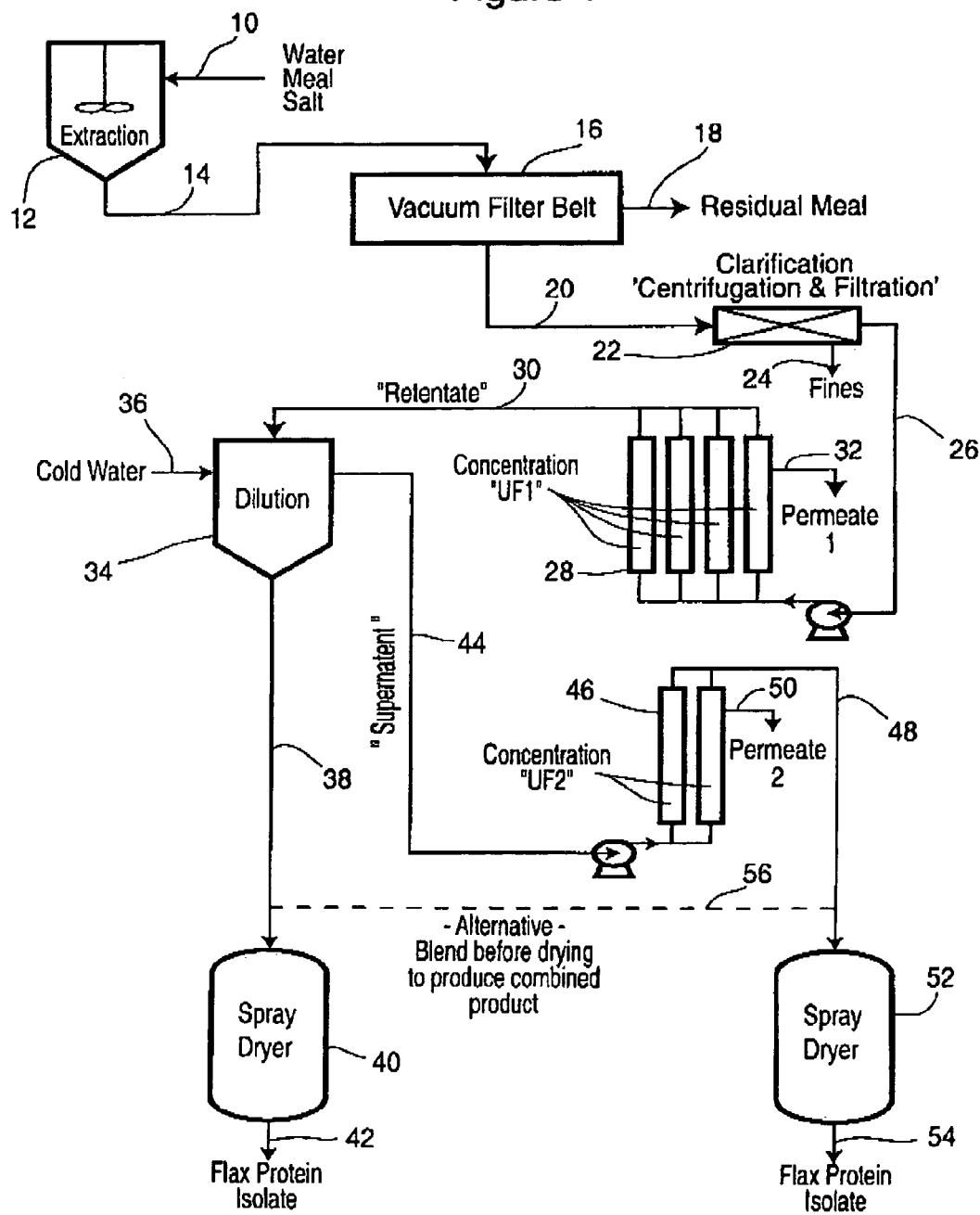
FIG. 1 is a schematic flow sheet of a procedure for producing a flax oil seed protein isolate in accordance with one embodiment of the invention.

The novel protein isolates provided herein are prepared by following generally the procedure described in U.S. Pat. No. 4,208,323, preferably under the specific conditions described herein. The process may be effected as a series of batch steps or as a continuous or semi-continuous process.

The initial step of the process of providing the flax or linola protein isolates involves solubilizing proteinaceous material from flax or linola oil seed meal. The proteinaceous material recovered from flax or linola seed meal may be the protein naturally occurring in flax or linola seed or the proteinaceous material may be a protein modified by genetic manipulation but possessing characteristic hydrophobic and polar properties of the natural protein. The flax or linola meal may be any flax or linola meal resulting from the removal of flax or linola oil from flax or linola oil seed with varying levels of non-denatured protein, resulting, for example, from hot hexane extraction or cold oil extrusion methods. The removal of flax or linola oil from flax or linola oil seed usually is effected as a separate operation from the protein isolate recovery procedure described herein.

Protein solubilization is effected most efficiently by using a salt solution since the presence of the salt enhances the removal of soluble protein from the oil seed meal. The salt usually is sodium chloride, although other salts, such as, potassium chloride, may be used. The salt solution has an ionic strength of at least about 0.10, preferably at least about 0.15, generally up to about 2.0 to enable solubilization of significant quantities of protein to be effected. As the ionic strength of the salt solution increases, the degree of solubilization of protein in the oil seed meal initially increases until a maximum value is achieved. Any subsequent increase in ionic strength does not increase the total protein solubilized. The ionic strength of the food grade salt solution which causes maximum protein solubilization varies depending on the salt concerned and the oil seed meal chosen.

In view of the greater degree of dilution required for protein precipitation with increasing ionic strengths, it is usually preferred to utilize an ionic strength value less than about 1.0 and more preferably a value of about 0.15 to about 0.6.

In a batch process, the salt solubilization of the protein is effected at a temperature of above about 0° C. and preferably up to about 35° C., preferably accompanied by agitation to decrease the solubilization time, which is usually about 10 to about 90 minutes. It is preferred to effect the solubilization to extract substantially the maximum amount of protein from the oil seed meal, so as to improve product yield. The upper preferred temperature limit of about 35° C. is chosen since the process becomes uneconomic at higher temperature levels in a batch mode.

In a continuous process, the extraction of the protein from the flax or linola oil seed meal is carried out in any manner consistent with effecting a continuous extraction of protein from the flax or linola oil seed meal. In one embodiment, the flax or linola oil seed meal is continuously mixed with a salt solution and the mixture is conveyed through a pipe or conduit having a length and at a flow rate for a residence time sufficient to effect the desired extraction in accordance with the parameters described herein. In such continuous procedure, the salt solubilization step is effected rapidly, in a time of up to about 10 minutes, preferably to effect solubilization to extract substantially the maximum amount of protein from the flax or linola oil seed meal. The solubilization in the continuous procedure preferably is effected at elevated temperatures, generally up to about 60° C. or more.

The aqueous food grade salt solution and the flax or linola oil seed meal have a natural pH of about 5 to about 7 to enable a protein isolate to be formed by the micellar route, as described in more detail below. The optimal pH value for maximum yield of flax or linola protein isolate varies depending on the flax or linola oil seed meal chosen.

At and close to the limits of the pH range, protein isolate formation occurs only partly through the micelle route and in lower yields than attainable elsewhere in the pH range. For these reasons, pH values of about 5.3 to about 6.2 are preferred.

The pH of the salt solution may be adjusted to any desired value within the range of about 4 to about 7 for use in the extraction step by the use of any convenient acid, usually hydrochloric acid, or alkali, usually sodium hydroxide, as required.

Another alternative procedure is to extract the oil seed meal with the salt solution at a relatively high pH value above 7, generally up to about 12, preferably about 7 to about 9. Greater quantities of protein are extracted from the oil seed meal at higher pH value. The pH of the salt solution, may be adjusted in pH to the alkaline value by the use of any convenient alkali, such as aqueous sodium hydroxide solution. Where such alternative is employed, the aqueous phase resulting from the oil seed meal extraction step then is separated from the residual canola meal, in any convenient manner, such as by employing vacuum filtration, followed by centrifugation and/or filtration to remove residual meal. The separated residual meal may be dried for disposal.

The aqueous protein solution resulting from the high pH extraction step then is pH adjusted to the range to about 4 to about 7, preferably about 5.3 to about 6.2, as discussed above, prior to further processing as discussed below. Such pH adjustment may be effected using any convenient acid, such as hydrochloric acid.

The concentration of oil seed meal in the food grade salt solution during the solubilization step may vary widely. Typical concentration values are about 5 to about 15% w/v.

The protein extraction step with the aqueous salt solution has the additional effect of solubilizing fats which may be present in the canola meal, which then results in the fats being present in the aqueous phase. It is known that flax or linola oil seed meal contains significant quantities of a mucilage material which enters the aqueous flax or linola protein solution, tending to make the solution somewhat viscous. Such initial relatively high viscosity tends to inhibit the degree to which the flax or linola protein solution can subsequently be concentrated, according to the procedure described below.

The protein solution resulting from the extraction step generally has a protein concentration of about 5 to about 30 g/L, preferably about 10 to about 25 g/L.

The aqueous phase resulting from the extraction step then may be separated from the residual flax or linola oil seed meal, in any convenient manner, such as by employing vacuum filtration, followed by centrifugation and/or filtration to remove residual meal. The separated residual meal may be dried for disposal.

Where the flax or linola seed meal contains significant quantities of fat, then the defatting steps described in U.S. Pat. Nos. 5,844,086 and 6,005,076, assigned to the assignee hereof and the disclosures of which are incorporated herein by reference may be effected on the separated aqueous protein solution and on the concentrated aqueous protein solution discussed below.

As an alternative to extracting the flax or linola oil seed meal with an aqueous salt solution, such extraction may be made using water alone, although the utilization of water alone tends to extract less protein from the flax or linola oil seed meal than the aqueous salt solution. Where such alternative is employed, then the salt, in the concentrations discussed above, may be added to the protein solution after separation from the residual flax or linola oil seed meal in order to maintain the protein in solution during the concentration step described below.

The aqueous protein solution then is concentrated to increase the protein concentration thereof while maintaining the ionic strength thereof substantially constant. Such concentration generally is effected to provide a concentrated protein solution having a protein concentration of at least about 50 g/L, preferably at least about 100 g/L.

The concentration step may be effected in any convenient manner consistent with batch or continuous operation, such as by employing any convenient selective membrane technique, such as ultrafiltration or diafiltration, using membranes, such as hollow-fibre membranes or spiral-wound membranes, with a suitable molecular weight cut-off, such as about 2000 to about 50,000 daltons, having regard to differing membrane materials and configurations, and, for continuous operation, dimensioned to permit the desired degree of concentration as the aqueous protein solution passes through the membranes.

The concentration step may be effected at any convenient temperature, generally about 15° to about 60° C., and for the period of time to effect the desired degree of concentration. The temperature and other conditions used to some degree depend upon the membrane equipment used to effect the concentration and the desired protein concentration of the solution.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as, carbohydrates, pigments and anti-nutritional factors, as well as any low molecular weight forms of the protein. The molecular weight cut-off of the membrane is usually chosen to ensure retention of a significant proportion of the protein in the solution, while permitting contaminants to pass through having regard to the different membrane materials and configurations.

Depending on the temperature employed in the concentration step, the concentrated protein solution may be warmed to a temperature of at least about 20°, and up to about 60° C., preferably about 25° to about 40° C., to decrease the viscosity of the concentrated protein solution to facilitate performance of the subsequent dilution step and micelle formation. The concentrated protein solution should not be heated beyond a temperature above which the temperature of the concentrated protein solution does not permit micelle formation on dilution by chilled water. The concentrated protein solution may be subject to a further defatting operation, if required, as described in U.S. Pat. Nos. 5,844,086 and 6,005,076.

The concentrated protein solution resulting from the concentration step and optional defatting step then is diluted to effect micelle formation by mixing the concentrated protein solution with chilled water having the volume required to achieve the degree of dilution desired. The concentrated protein solution is diluted by about 15 fold or less, preferably about 10 fold or less.

The chilled water with which the concentrated protein solution is mixed has a temperature of less than about 15° C., generally about 3° to about 15° C., preferably less than about 10° C., since improved yields of protein isolate in the form of protein micellar mass are attained with these colder temperatures at the dilution factors used.

In a batch operation, the batch of concentrated protein solution is added to a static body of chilled water having the desired volume, as discussed above. The dilution of the concentrated protein solution and consequential decrease in ionic strength causes the formation of a cloud-like mass of highly associated protein molecules in the form of discrete protein droplets in micellar form. In the batch procedure, the protein micelles are allowed to settle in the body of chilled water to form an aggregated, coalesced, dense, amorphous, sticky gluten-like protein micellar mass (PMM). The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of dried isolate.

Alternatively, the dilution operation may be carried out continuously by continuously passing the concentrated protein solution to one inlet of a T-shaped pipe, while the diluting water is fed to the other inlet of the T-shaped pipe, permitting mixing in the pipe. The diluting water is fed into the T-shaped pipe at a rate sufficient to achieve the desired degree of dilution.

The mixing of the concentrated protein solution and the diluting water in the pipe initiates the formation of protein micelles and the mixture is continuously fed from the outlet from the T-shaped pipe into a settling vessel, from which, when full, supernatant is permitted to overflow. The mixture preferably is fed into the body of liquid in the settling vessel in a manner which minimizes turbulence within the body of liquid.

In the continuous procedure, the protein micelles are allowed to settle in the settling vessel to form an aggregated, coalesced, dense, amorphous, sticky, gluten-like protein micellar mass (PMM) and the procedure is continued until a desired quantity of the PMM has accumulated in the bottom of the settling vessel, whereupon the accumulated PMM is removed from the settling vessel.

By the utilization of a continuous process for the recovery of flax or linola protein isolate as compared to the batch process, the initial protein extraction step can be significantly reduced in time for the same level of protein extraction and significantly higher temperatures can be employed in the extraction step. In addition, in a continuous operation, there is less chance of contamination than in a batch procedure, leading to higher product quality and the process can be carried out in more compact equipment.

The settled isolate is separated from the residual aqueous phase or supernatant, such as by decantation of the residual aqueous phase from the settled mass or by centrifugation. The PMM may be used in the wet form or may be dried, by any convenient technique, such as spray drying, freeze drying or vacuum drum drying, to a dry form. The dry flax or linola protein isolate has a high protein content, in excess of about 90 wt % protein, preferably at least about 100 wt % protein (calculated as Kjeldahl N×6.25), and is substantially undenatured (as determined by differential scanning calorimetry). The dry flax protein isolate isolated from fatty oil seed meal also has a low residual fat content, when the procedures of U.S. Pat. Nos. 5,844,086 and 6,005,076 are employed, which may be below about 1 wt %.

In accordance with one aspect of the invention, it has now been found that the supernatant from the PMM formation and settling step contains significant amounts of flax or linola protein, not precipitated in the dilution step.

In such procedure, the supernatant from the dilution step, following removal of the PMM, may be concentrated to increase the protein concentration thereof. Such concentration is effected using any convenient selective membrane technique, such as ultrafiltration, using membranes with a suitable molecular weight cut-off permitting low molecular weight species, including the food grade salt and other non-proteinaceous low molecular weight materials extracted from the source material, to pass through the membrane, while retaining flax protein in the solution. Ultrafiltration membranes having a molecular weight cut-off of about 3000 to 10,000 daltons having regard to differing membranes and configurations, may be used. Concentration of the supernatant in this way also reduces the volume of liquid required to be dried to recover the protein, and hence the energy required for drying. The supernatant generally is concentrated to a protein content of about 100 to 400 g/L, preferably about 200 to about 300 g/L, prior to drying.

The concentrated supernatant may be dried by any convenient technique, such as spray drying, freeze drying or vacuum drum drying, to a dry form to provide a further flax protein isolate. Such further flax protein isolate has a high protein content, usually in excess of about 90 wt % protein (calculated as Kjeldahl N×6.25) and is substantially undenatured (as determined by differential scanning calorimetry). If desired, the wet PMM may be combined with the concentrated supernatant prior to drying the combined protein streams by any convenient technique to provide a combined flax protein isolate. The combined flax protein isolate has a high protein content, in excess of about 90 wt % (calculated as Kjeldahl N×6.25) and is substantially undenatured (as determined by differential scanning calorimetry).

In another alternative procedure, a portion only of the concentrated supernatant may be mixed with at least part of the PMM and the resulting mixture dried. The remainder of the concentrated supernatant may be dried as any of the remainder of the PMM. Further, dried PMM and dried supernatant also may be dry mixed in any desired relative proportions.

By operating in this manner, a number of flax protein isolates may be recovered, in the form of dried PMM, dried supernatant and dried mixtures of various proportions by weight of PMM and supernatant, generally from about 5:95 to about 95:5 by weight, which may be desirable for attaining differing functional and nutritional properties.

As an alternative to dilution of the concentrated protein solution into chilled water and processing of the resulting precipitate and supernatant as described above, protein may be recovered from the concentrated protein solution by dialyzing the concentrated protein solution to reduce the salt content thereof. The reduction of the salt content of the concentrated protein solution results in the formation of protein micelles in the dialysis tubing. Following dialysis, the protein micelles may be permitted to settle, collected and dried, as discussed above. The supernatant from the protein micelle settling step may be processed, as discussed above, to recover further protein therefrom. Alternatively, the contents of the dialysis tubing may be directly dried. The latter alternative procedure is useful where small laboratory scale quantities of protein are desired.

An alternative procedure for production of the flax protein isolate is to utilize an iso-electric precipitation procedure. In such a procedure, extraction of the oil seed meal is effected under alkaline conditions, following which the pH of the protein solution is adjusted to a lower value, particularly the pH of the iso-electric point of the targeted protein, at which pH value the protein has a neutral change and precipitates out of solution. The precipitates may be washed to remove contaminants by resuspending the precipitate in water and reprecipitating the protein.

DESCRIPTION OF PREFERRED EMBODIMENT

Referring to FIG. 1, there is illustrated schematically a flow sheet of a batch process carried out in accordance with one embodiment to the invention. Flax oil seed meal, which may be linola oil seed meal, and aqueous extraction medium are fed by line 10 to an extraction vessel 12 wherein the oil seed meal is extracted and an aqueous protein solution is formed. The slurry of aqueous protein solution and residual oil seed meal is passed by line 14 to a vacuum filter belt 16 for separation of the residual oil seed meal which is removed by line 18. The aqueous protein solution then is passed by line 20 to a clarification operation 22 wherein the aqueous protein solution is centrifuged and filtered to remove fines, which are recovered by line 24.

The clarified aqueous protein solution is pumped by line 26 through ultrafiltration membrane 28 to produce a concentrated protein solution as the retentate in line 30 with the permeate being recovered by line 32. The concentrated protein solution is passed into a precipitation vessel 34 containing cold water fed by line 36. Protein micellar mass formed in the precipitation vessel 34 is removed by line 38 and passed through a spray dryer 40 to provide dry flax protein isolate 42.

Supernatant from the precipitation vessel 34 is removed by line 44 and pumped through ultrafiltration membranes 46 to produce a concentrated protein solution as the retentate in line 48 with the permeate being removed by line 50. The concentrated protein solution is passed through a spray dryer 52 to provide further dry flax protein isolate 54.

As an alternative, the concentrated protein solution in line 48 may be passed by line 56 to mix with the protein micellar mass before the mixture then is dried in spray dryer 40.

EXAMPLES

Example 1

This Example illustrates the recovery of linola protein from linola oil seed.

Linola oil seed was cold pressed and the oil recovered. 16.8 kg of crushed meal was added to 335 L of 0.15 M NaCl solution (5% w/v extraction concentration at 13° C.) and the mixture agitated for 60 mins, followed by a 60 min. settling period. 190 L of extract was decanted and filtered through 20 µm filter pads to provide 180 L of an aqueous protein solution having a protein content of 6 g/L.

The aqueous solution was reduced in volume to 11 L by concentration on an ultrafiltration system using 30,000 daltons molecular weight cut-off. The resulting concentrated solution had a protein content of 6 g/L, which represented a yield of 51 wt % of the protein originally extracted from the linola meal.

The concentrated protein solution at a temperature of 30° C. was added to water at 4° C. at a dilution ratio of 1:10. A white cloud formed immediately and was allowed to settle for 16 hours. 93 L of supernatant was decanted leaving 12 L of precipitated, viscous, sticky protein mass (PMM). An aliquot of PMM was freeze dried to determine protein content. The freeze dried PMM was found to have a protein content of 92 wt % (N ×6.25) d.b. The overall yield of protein from the protein extracted from the linola meal was 27 wt %.

Example 2

This Example illustrates the recovery of flax protein from flax oil seed meal.

17.5 kg of commercial flax oil seed meal was added to 350 L of 0.5M NaCl solution (5% w/v) at 20° C. and the mixture was agitated for 60 minutes followed by 60 minutes settling time. The resulting protein extract solution had a protein concentration of 8.5 g/L. A further 17.5 kg batch of commercial flax oil seed meal was processed in the same way and the resulting protein extract solution had a protein concentration of 7.9 g/L. The two extract solutions were decanted and filtered using 20 µm filter pads in a filter press and the filtrates combined.

The filtered aqueous protein solution then was concentrated on an ultrafiltration system using 5,000 daltons molecular weight cut-off to provide 11 L of a concentrated aqueous protein solution having a protein content of 120 g/L.

The concentrated protein solution at a temperature 31° C. was added to tap water at 4° C. at a dilution ratio of 1:10. A white cloud formed immediately and was allowed to settle for 16 hours at 4° C. 105 L of supernatant was decanted leaving 10 L of precipitated, viscous, sticky protein mass (PMM). The PMM was centrifuged at 10,000 g for five minutes to provide a dense white mass, which then was freeze dried.

178 g of dried protein isolate was recovered, corresponding to an overall yield of protein extracted from the flax oil seed meal of 6 wt %. The freeze dried PMM was found to have a protein content of 109 wt % (N ×6.25) d.b.

Example 3

This Example illustrates the effect of pH on linola extraction.

Linola oil seed meal was extracted in a 5% w/v solution with the extraction pH adjusted with either NaOH or HCl to the derived pH levels of 4, 5, 6, 7, 8, 9, 10, 11 and 12. All extractions were performed at room temperature and effected in an orbital shaker for 30 minutes at 230 RPM. Following the mixing period, the spent meal was separated from the extract and samples taken for protein content analysis.

The results obtained are set forth in the following Table I:

TABLE I

| Extraction pH | Extraction Protein |
|---|---|
| 12 | 0.942% |
| 11 | 0.708% |
| 10 | 0.522% |
| 9 | 0.616% |
| 8 | 0.514% |
| 7 | 0.330% |
| 6 | 0.264% |
| 5 | 0.165% |
| 4 | 0.188% |

As may be seen, the extractions are higher pH yielded more protein than the lower pH extractions. Extractions at pH 5.0 and 4.0 were quite cloudy in appearance, indicating some precipitation.

SUMMARY OF DISCLOSURE

In summary of this disclosure, the present invention provides novel flax and linola protein isolates and procedures for their preparation. Modifications are possible within the scope of the invention.

What we claim is:

1. A process of preparing a flax protein isolate, which comprises:
   (a) extracting a flax oil seed meal to cause solubilization of protein in said oil seed meal and to form an aqueous protein solution,
   (b) separating the aqueous protein solution from the residual oil seed meal,
   (c) increasing the protein concentration of said aqueous protein solution while maintaining the ionic strength substantially constant by using a selective membrane technique to provide a concentrated protein solution,
   (d) said concentrated protein solution is warmed to a temperature of at least about 20° C. to decrease the viscosity of the concentrated protein solution but not beyond a temperature above which the temperature of the concentrated protein solution does not permit micelle formation upon subsequent dilution,
   (e) diluting said concentrated protein solution into chilled water to cause the formation of protein micelles,
   (f) settling the protein micelles to form an amorphous, sticky, gelatinous, gluten-like protein micellar mass, and
   (g) recovering the micellar mass from supernatant having a protein content of at least about 90 wt %, as determined by Kjeldahl nitrogen ×6.25 on a dry weight basis.

2. The process of claim 1 wherein said extracting of said flax oil seed meal is effected using an aqueous salt solution having an ionic strength of at least about 0.10 and a pH of about 4 to about 7.

3. The process of claim 2 wherein said salt solution has an ionic strength of about 0.15 to about 0.6.

4. The process of claim 2 wherein said salt solution has a pH of about 5.3 to about 6.2.

5. The process of claim 1 wherein said extracting of said flax oil seed meal is effected using an aqueous salt solution having an ionic strength of at least about 0.10 and a pH of about 7 to about 12.

6. The process of claim 5 wherein said pH is about 7 to about 9.

7. The process of claim 5 wherein, following said extraction step, the pH of the aqueous protein solution is adjusted to about 4 to about 7 prior to said concentration step.

8. The process of claim 1 wherein said oil seed meal is extracted by water and subsequent thereto salt is added to the resulting aqueous protein solution to provide an aqueous protein solution having an ionic strength of at least about 0.10.

9. The process of claim 1 wherein said aqueous protein solution has a protein content of about 5 to about 30 g/L.

10. The process of claim 1 wherein said protein concentrating step is effected to provide a concentrated protein solution having a concentration of at least about 50 g/L.

11. The process of claim 10 wherein the protein concentration is at least about 100 g/L.

12. The process of claim 1 wherein said concentrated protein solution is diluted by about 15 fold or less by adding the concentrated protein solution into a body of water having the volume required to achieve the desired degree of dilution.

13. The process of claim 12 wherein said body of water has a temperature of less than about 10° C.

14. The process of claim 13 wherein said concentrated protein solution is diluted by about 10 fold or less.

15. The process of claim 1 wherein the recovered protein micellar mass is dried to a proteinaceous powder.

16. The process of claim 1 wherein supernatant from the settling step is processed to recover further flax protein isolate.

17. The process of claim 16 wherein the supernatant is concentrated using a membrane technique and the concentrated supernatant is dried.

18. The process of claim 1 wherein steps (a) to (g) are effected in batch operation.

19. The process of claim 1 wherein steps (a) to (g) are effected in a continuous operation.

20. The process of claim 1 wherein steps (a) to (g) are effected in a semi-continuous manner.

21. The process of claim 1 wherein said flax oil seed meal is linola oil seed meal.

* * * * *